United States Patent [19]

Rector

[11] Patent Number: 4,954,998

[45] Date of Patent: Sep. 4, 1990

[54] METHOD FOR REDUCING NOISE IN DRILL STRING SIGNALS

[75] Inventor: James W. Rector, Menlo Park, Calif.

[73] Assignee: Western Atlas International, Inc., Houston, Tex.

[21] Appl. No.: 300,315

[22] Filed: Jan. 23, 1989

[51] Int. Cl.$^5$ .............................................. G01V 1/40
[52] U.S. Cl. ........................................ 367/82; 367/40; 367/49; 367/57; 340/857
[58] Field of Search ....................... 367/38, 39, 40, 49, 367/57, 82; 340/857

[56] References Cited

U.S. PATENT DOCUMENTS

| | | | |
|---|---|---|---|
| 4,254,481 | 3/1981 | Suitler et al. | 367/82 |
| 4,363,112 | 12/1982 | Widrow | 367/49 |
| 4,718,048 | 1/1988 | Staron et al. | 367/40 |

Primary Examiner—Ian J. Lobo
Attorney, Agent, or Firm—E. Eugene Thigpen

[57] ABSTRACT

The invention is a method for improving quality of seismic data generatd with a source positioned substantially at the lower end of a drill string within a wellbore. A pilot signal is detected at the upper end of the drill string for cross-correlation with signals detected by field sensors positioned at the earth's surface displaced from the wellbore. Noise is reduced in the pilot signal by detecting the noise wih a sensor positioned to be sensitive to the noise but substantially insensitive to the acoustic signal transmitted up the drill string from the source. The frequency band within which there is high coherence between the energy in the noise signal and the pilot signal is determined. The noise signal is then amplified by a factor equal to the average ratio of the energy amplitude of the pilot signal to the noise signal within this frequency band, and this weighted noise signal is substracted from the pilot signal to reduce the noise in the pilot signal.

31 Claims, 7 Drawing Sheets

METHOD FOR REDUCING NOISE IN DRILL STRING SIGNALS

BACKGROUND OF INVENTION

1. Field of the Invention

This invention relates to vertical seismic profiling and more particularly to a method for reducing noise in a detected signal.

2. Description of the Prior Art

Conventional reflection seismology utilizes surface sources and receivers to detect reflections from subsurface impendance contrasts. Presently a technique commonly known as Vertical Seismic Profiling (VSP) is utilized to image the subsurface in the vicinity of a borehole. With VSP, typically, a source is activated at the surface and sensors are positioned at discrete borehole depths with a wireline. More recently methods have been developed for performing VSP with a downhole source and with receivers positioned on the surface. With the source positioned downhole, data can be acquired simultaneously at many surface locations with little more expense than for a single location. One such method utilizes the drill bit as the downhole source. In this method, a sensor is positioned near the top of the drill string to record a reference or pilot signal and field sensors are positioned at selected locations in the vicinity of the wellbore. The signal generated by the drill bit travels up the drill string to the reference (pilot) sensor and also propagates from the drill bit upward to the field sensors. The drill bit signal also propagates downwardly to reflecting subsurface interfaces and back to the field sensors. By correlating the signal detected by the pilot sensor with the signal detected by the field sensors, the travel time of the energy traveling from the drill bit to the field sensors may be determined. The travel times may then be utilized to map the location of the reflecting subsurface interfaces. Noise which is present in the pilot signal will degrade the quality of the correlated signal. It is an object of this invention to reduce the noise in the signal detected by the pilot sensor.

SUMMARY OF THE INVENTION

The invention is a method for improving quality of seismic data generated with a source positioned substantially at the lower end of a drill string within a wellbore. A pilot signal is detected at the upper end of the drill string for cross-correlation with signals detected by field sensors positioned at the earth's surface displaced from the wellbore. Noise is reduced in the pilot signal by detecting the noise with a sensor positioned to be sensitive to the noise but substantially insensitive to the acoustic signal transmitted up the drill string from the source. The frequency band within which there is high coherence between the energy in the noise signal and the pilot signal is determined. The noise signal is then amplified by a factor equal to the average ratio of the energy amplitude of the pilot signal to the noise signal within this frequency band, and this weighted noise signal is subtracted from the pilot signal to reduce the noise in the pilot signal.

BRIEF DESCRIPTION OF THE DRAWINGS

A more complete understanding of the invention may be gained from the appended detailed description and the drawings, wherein.

DESCRIPTION OF THE PREFERRED EMBODIMENT

Figure 1:
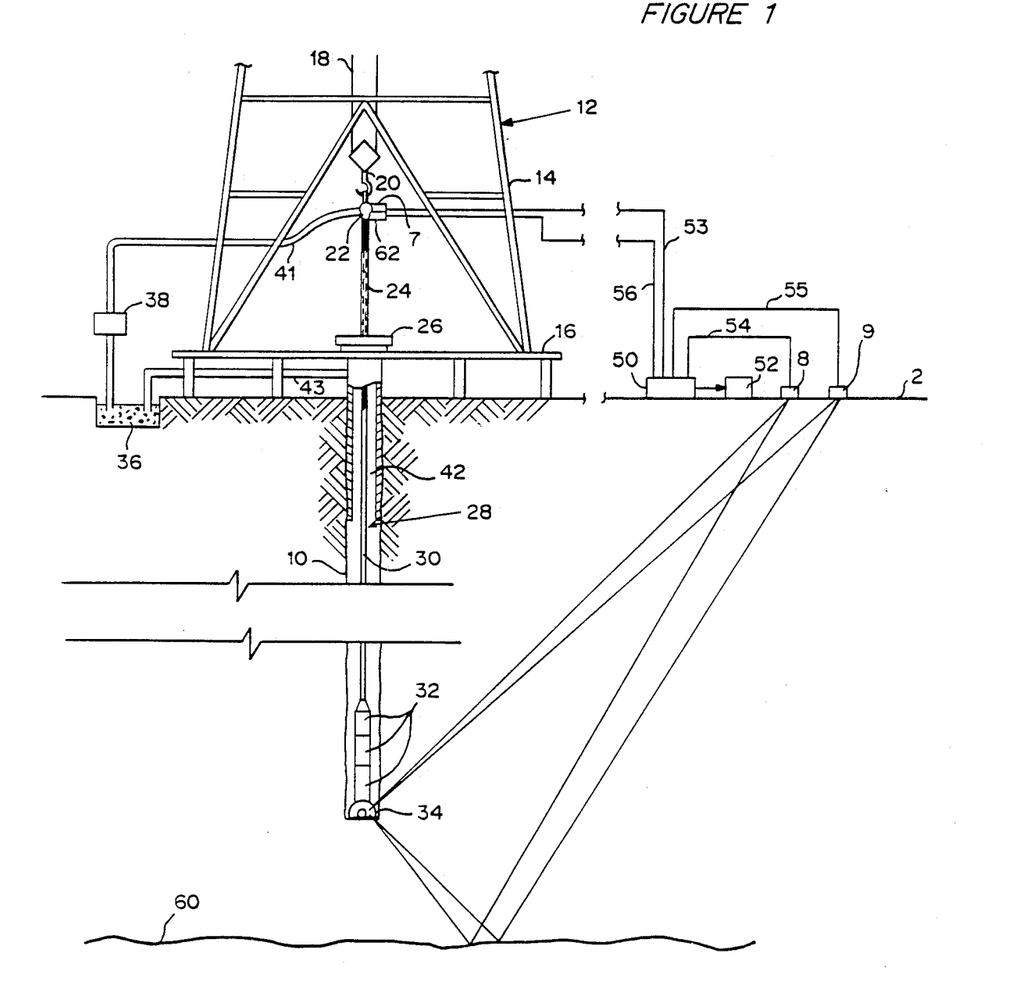
FIG. 1 shows the deployment of apparatus for practicing the invention.

FIG. 1 shows a well 10 being drilled in the earth with a rotary drilling rig 12. The drilling rig includes the usual derrick 14, derrick floor 16, draw works 18, hook 20, swivel 22, kelly joint 24, rotary table 26, and a drill string 28 made up of drill pipe 30 secured to the lower end of a kelly joint 24 and to the upper end of a section of drill collars 32, which carry a drill bit 34. Drilling fluid circulates from a mud pit 36 through a mud pump 38 and a mud supply line 41 and into the swivel 22. The drilling mud flows down through the kelly joint, drill pipe and drill collars, and through nozzles (not shown) in the lower face of the drill bit. The drilling mud flows back up through an annular space 42 between the outer diameter of the drill string and the well bore to the surface, where it is returned to the mud pit through a mud return line 43.

A first sensor 7 and a second sensor 62 are mounted on the upper portion of the drill string 28. In a particular preferred embodiment, sensors 7 and 62 are mounted on swivel 22. Sensor 7 is adapted to detect vertical motion of the drill string. Sensor 62 is adapted to detect horizontal motion of the drill string. In a preferred embodiment, sensors 7 and 62 may be accelerometers, with sensor 7 being positioned to sense vertical accelerations and sensor 62 being positioned to sense horizontal accelerations. Sensor 7 is sometimes referred to herein as the pilot sensor. Normally, a plurality of field sensors, such as geophones 8 and 9, are located on the surface 2 at suitable locations. The sensors 7 and 62 and the geophones 8 and 9 are connected by means of conductors 53–56 or by telemetering to an amplifier 50 connected to a recorder 52.

The impact of the bit 34 on the rock at the bottom of the borehole 10 generates elastic waves which propagate vertically upward through the drill string, and radially outward into the earth formation. The drill string path has little attenuation of acoustic energy by virtue of its steel composition and, therefore, energy which is representative of the vibrations emitted by the drill bit 34 into the earth formation is detected by sensor 7 at the top of the drill string. Signals emitted into the earth will travel upwardly to the field sensors and will also be reflected from subsurface interfaces, such as interface 60 beneath the drill bit, back to the field sensors. Normally, the transmission time of the signal from the drill bit to the field sensors is determined from cross-correlation of the signal detected by the sensor 7 with the signals detected by the field sensors.

Those of ordinary skill in the art will understand that extraneous energy originating from sources other than the drill bit which appears in the signal detected by either the pilot sensor 7 or the field geophones 8 or 9 will result in degradation in the quality of the cross-correlated signals.

A band of high amplitude noise in the frequency range between about 40 Hz and 80 Hz has been observed in the signal detected by the pilot sensor. It was determined from observing the acoustic energy detected by an accelerometer positioned to sense horizontal motion at the top of the drill string that energy within this same frequency band also appeared in the signal detected by the sensor adapted to detect horizontal motion.

Figure 2:
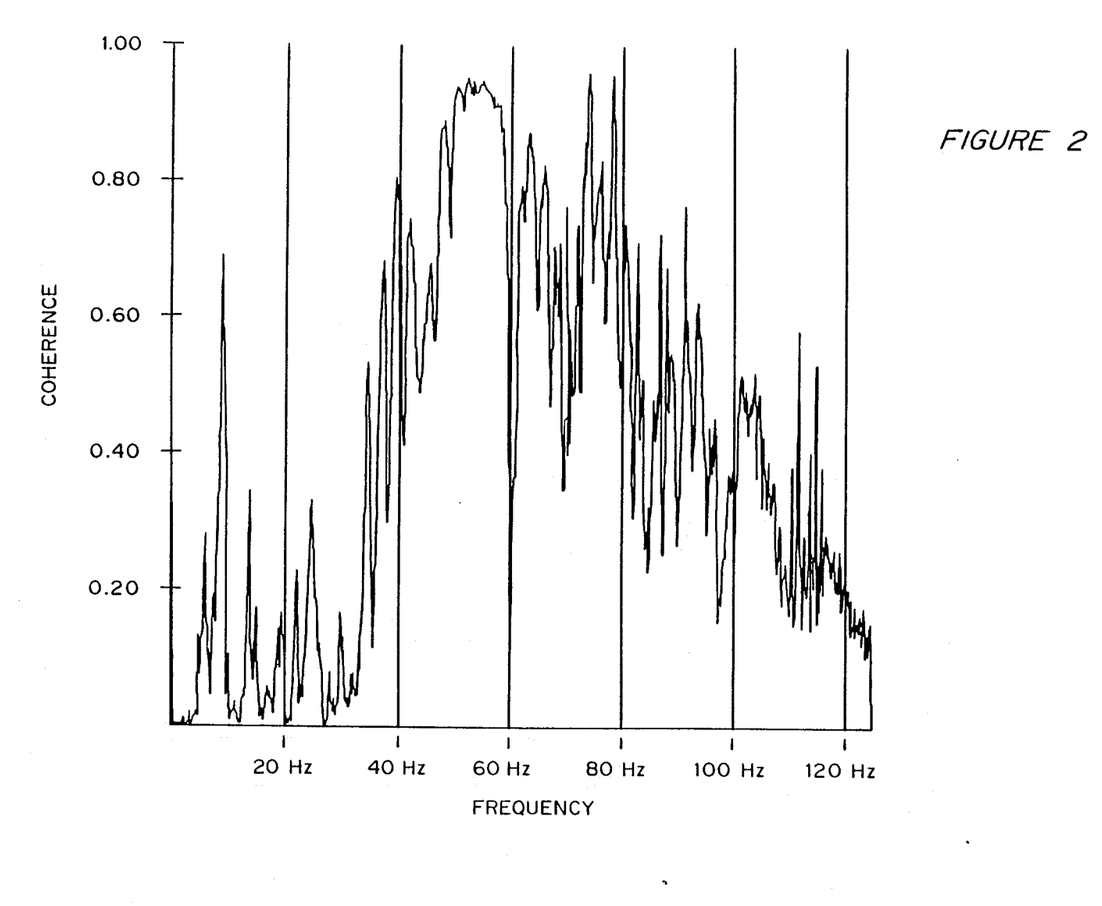
FIG. 2 shows the coherence of vertically oriented and horizontally oriented acoustic energy detected at the top of a drill string while drilling.

FIG. 2 shows a coherence function between energy sensed by the vertical sensor 7 and energy sensed by the horizontal sensor 62. The coherence function is equal to the cross spectrum between the two signals divided by the product of each of the signal spectra. The signal originating from the drill bit and travelling up the drill string is vertically polarized. Normally, very little of the drill bit energy is detected by the sensor which is mounted to sense horizontal motion. Although the drill bit signal may extend to a frequency of about 200 Hz, the drill bit energy is primarily in the range below 40 Hz and, accordingly, there is low correlation, below 40 Hz, between the energy detected by the horizontal sensor and the vertical sensor. However, the extraneous energy resulting from non-vertical accelerations of the drill string is present in the signal detected by the vertical sensor as well as in the signal detected by the horizontal sensor. As illustrated in FIG. 2, the coherence in the range between about 40 Hz and about 80 Hz is high.

Figure 3A:
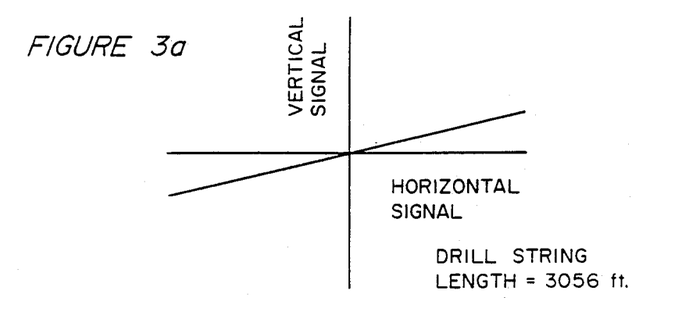
FIGS. 3a, 3b and 3c show hodograms of horizontal vs. vertical acoustic energy detected at the top of a drill string for three different drill string lengths.
Figure 3B:
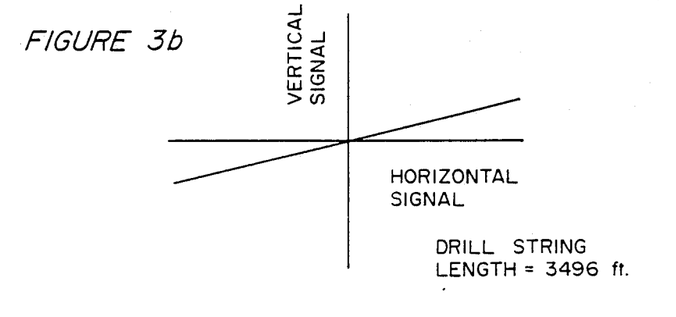
Figure 3C:
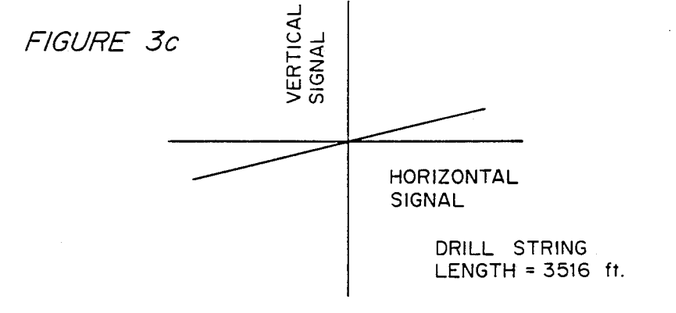

FIGS. 3a, 3b and 3c show hodograms of the energy detected by the vertical sensor plotted against the energy detected by the horizontal sensor within the frequency range of about 45 Hz to about 80 Hz. As shown in the figures, the amplitude of the vertical energy is linearly proportional to the amplitude of the horizontal energy. This linear relation between the horizontal and vertical energy makes it possible to remove the extraneous energy from the vertical (pilot) signal by directly subtracting the appropriately weighted horizontal signal from the vertical signal.

Figure 4:
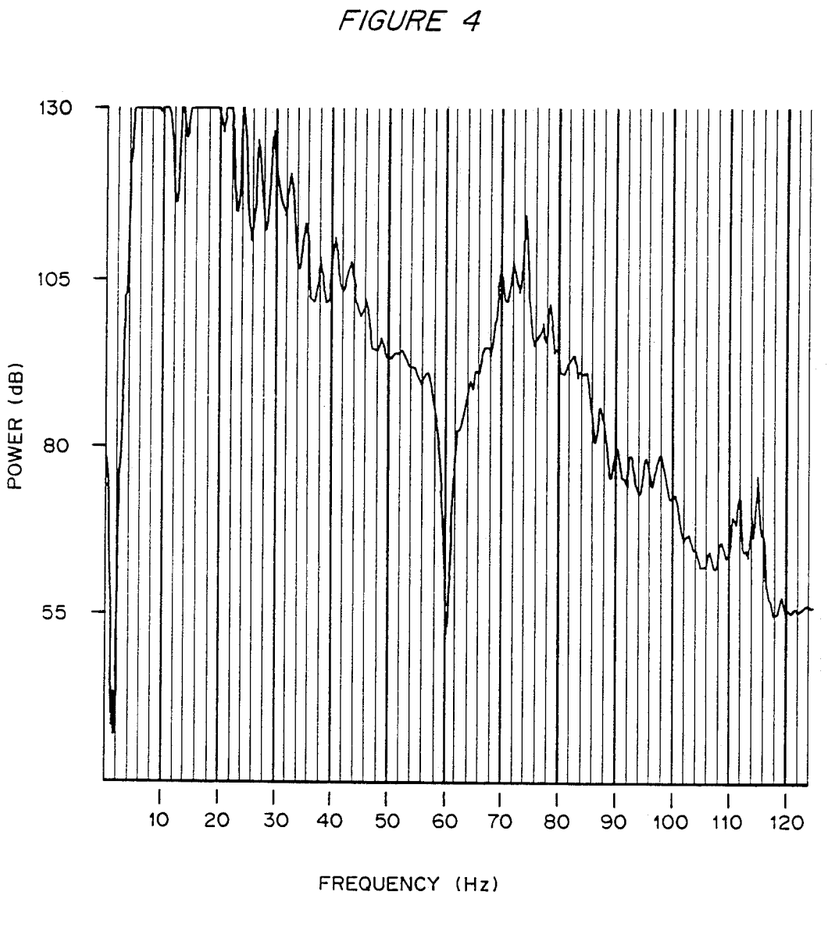
FIG. 4 shows a frequency spectrum of amplitude vs. frequency of acoustic energy detected at the top of the drill string by a vertically oriented sensor.
Figure 5:
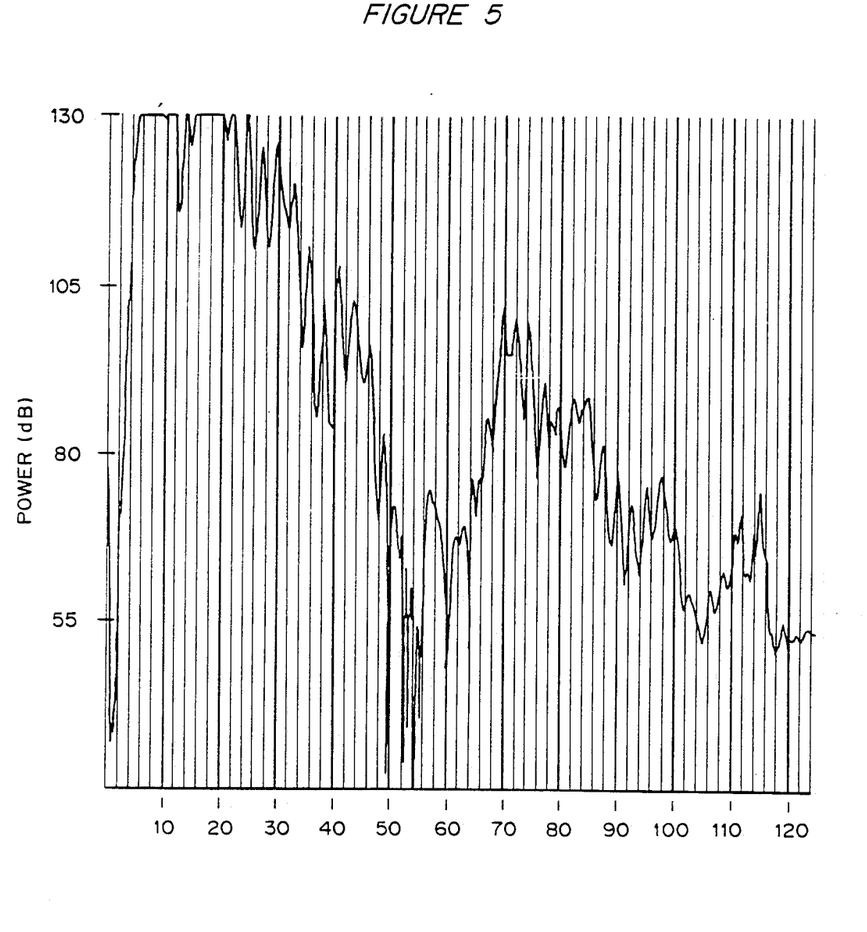
FIG. 5 shows a frequency spectrum of amplitude vs. frequency after the energy detected by a horizontally oriented sensor is subtracted from the energy detected by the vertically oriented sensor.

FIG. 4 shows the spectrum of the detected vertical signal prior to subtraction of the horizontal signal. FIG. 5 shows this same vertical signal spectrum, but after subtraction of the appropriately weighted horizontal signal. The reduction in the extraneous energy in the vertical signal in the frequency range between about 45 Hz and 80 Hz is evident.

Figure 6:
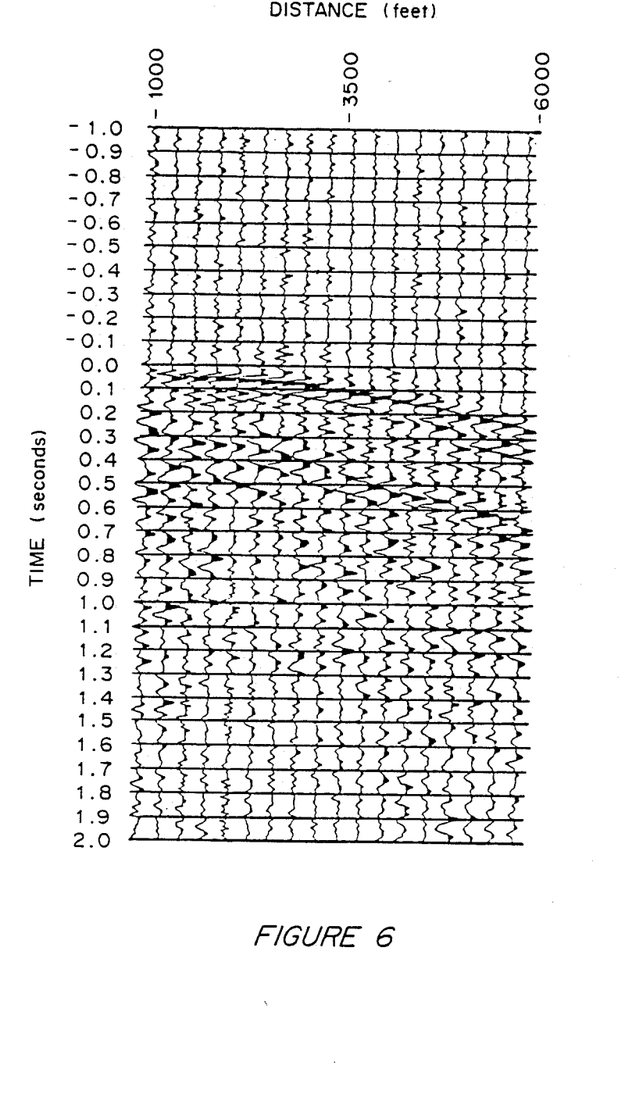
FIG. 6 shows cross-correlated data prior to application of the present invention.
Figure 7:
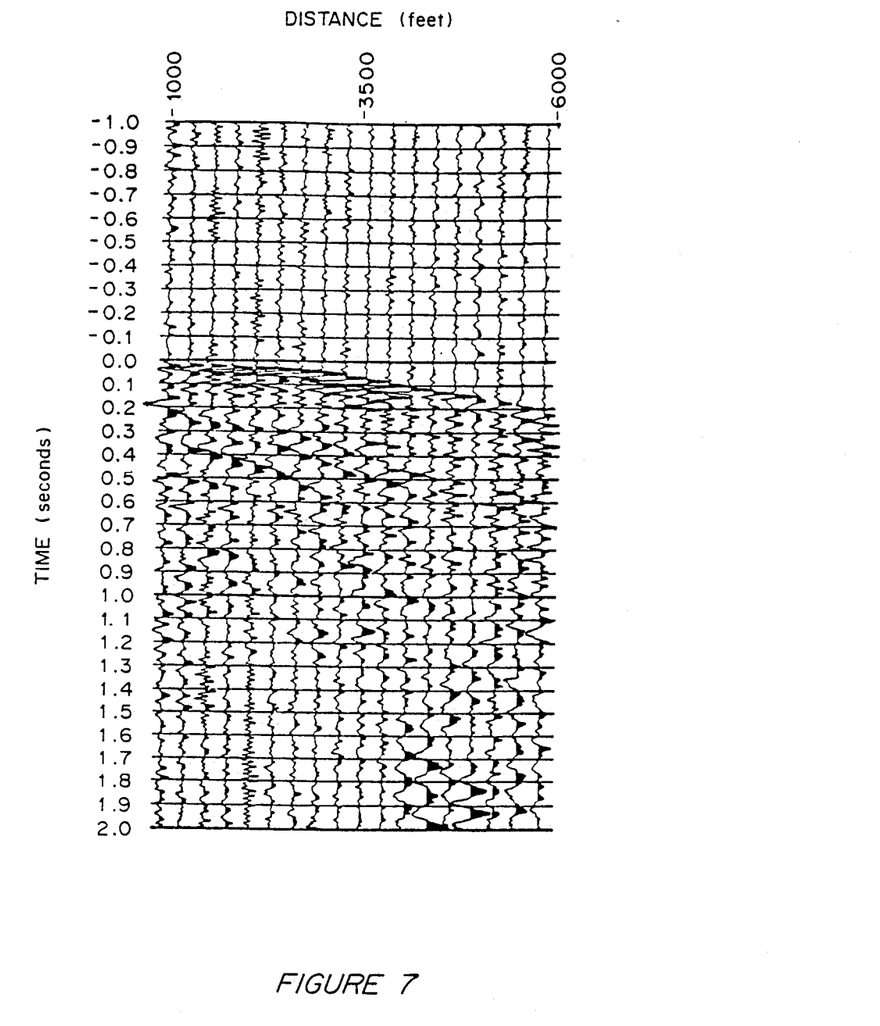
FIG. 7 shows cross-correlated data after application of the present invention.

FIGS. 6 and 7 show cross-correlation sections in which the signals detected by field geophones positioned at distances of 1000 to 6000 feet from the wellbore have been correlated with the pilot (vertical) signal. FIG. 6 shows a cross-correlation section without implementation of the presently described invention. FIG. 7 shows the same data, but with noise reduction in the detected pilot signal using the presently described invention. The direct arrivals display improved wavelet characteristics after subtraction of the horizontal signal, which facilitates travel time picking and reflector analysis.

Normally, signals from pilot sensor 7, horizontal sensor 62 and the various field geophones, such as geophones 8 and 9, will be recorded separately. The subtraction of the horizontal signal from the pilot signal and correlation of the pilot signal with the field geophone signals may be performed at the drill site in field work stations or at a data processing center.

The frequency band over which there is high coherence in the extraneous energy in the vertical (pilot) signal and in the horizontal (noise) signal may vary with drilling conditions and with the drilling equipment. For example, the amplitude of the drill bit signal travelling up the drill string is dependent upon drilling and hole conditions, such as the weight on the drill bit and the bit type. A stronger drill bit signal can reduce the coherence between the vertical and horizontal signals because there may be a significant drill bit signal in the vertical signal in the 40 to 80 Hz range.

To determine the relative magnitude of extraneous energy in the frequency band of high coherence, the pilot signal and noise (horizontal) signal may be passed through a filter having a pass band substantially equal to the band of high coherence. Normally, a number of time samples are taken to determine the average ratio of energy in the high coherence band between the pilot signal and the noise signal. The pilot signal and noise signal may also be converted to the frequency domain for determining the ratio of the energy in the pilot signal and noise signal within the high coherence frequency band. It has been determined that this ratio can change significantly within a time span of a few minutes. However, if the ratio is recomputed at about 5 second intervals, significant error will not normally result from change in the energy ratio. The frequency with which this ratio needs to be determined may need to be re-evaluated at different drilling conditions.

Prior to subtracting the noise signal from the pilot signal, the portion of the noise signal to be subtracted from the pilot signal is weighted by a factor equal to the average ratio, within the high coherence band, of the pilot signal magnitude to the noise signal magnitude. The "average" may be determined on the basis of the numerical average of the ratio of vertical to horizontal energy in the frequency band of high coherence or from the median value thereof for data samples recorded within a selected block of time. A running average may also be utilized in which one or more new samples of data are added to the data block to be averaged as the same number of old samples are deleted from the data block to be averaged.

A properly weighted error signal may be subtracted from the pilot signal in either the time domain or the frequency domain.

The signal from the drill bit travels vertically up the drill string so that, normally, no substantial portion of the drill bit signal is detected by the horizontal sensor. If it is determined that the only significant energy in the error signal is the energy in the high coherence frequency band, the properly weighted error signal may be subtracted in its entirety from the pilot signal. Alternatively, the signal which is subtracted from the pilot signal may be only the portion of the horizontal signal within the frequency band of high coherence.

The frequency band over which there is high coherence between the vertical and horizontal signals may be determined at each drilling location. The particular drilling equipment used may result in variations in the frequency range in which the extraneous energy appears in the pilot and the error signals. A coherence function, as shown in FIG. 2, may be computed for the horizontal (noise) and vertical (pilot) signals and the frequency range over which a high degree of coherence exists determined from the display. Of necessity, a degree of judgment will be required in selecting the high coherence frequency range from the display. For the display of FIG. 2, a high degree of correlation exists between about 45 and about 80 Hz.

In many instances, the ratio between the horizontal and vertical signals in the high coherence frequency band may be substantially constant as a function of frequency. It may be desirable, however, to derive a "weight vector" that is not a single ratio value, but changes with frequency. A weight vector is desired which, when convolved with the horizontal signal, yields a signal substantially equal to the vertical signal and which minimizes the error between the derived signal and the vertical signal. In mathematical notation:

$$H(t) * w(t) = V(t) + E(t)$$

where
H(t) = horizontal signal
W(t) = weight vector
V(t) = vertical signal
E(t) = minimum error, and
* represents convolution.

Wiener filters may be used to derive a weight vector that minimizes the mean squared error. The weight vector equation may be expressed as follows:

$$\phi_{HH}(t) * w(t) = \phi_{HV}(t)$$

where
$\phi_{HH}$ = autocorrelation of horizontal signal
$\phi_{HV}$ = cross-correlation of horizontal and vertical signal.

In matrix form, the preceding equation can be written as:

$$H^T H W = H^T V$$

the matrix solution for W is:

$$W = (H^T H)^{-1} (H^T V)$$

If it is determined that, under certain drilling conditions, there is a plurality of frequency bands of high coherence between extraneous energy present in the horizontal and vertical signals, the method of the present invention may be applied sequentially for each such frequency band. Alternatively, the method may be applied simultaneously to such plurality of frequency bands.

It is contemplated that the data processing steps of the invention described herein will be performed with a digital computer, either in a field work station or at a data processing center. Specific programming steps to implement the steps of the invention are within the ability of one of ordinary skill in the art.

Sensor element 62 may include two accelerometers, with one of the accelerometers being positioned to sense horizontal accelerations along a first axis and the second accelerometer being positioned to sense horizontal accelerations along a second axis orthogonal to the first axis. The magnitude of the signals detected along the first orthogonal axis, $H_x$, and along the second orthogonal axis, $H_y$, are utilized to determine the resultant horizontal signal, H(t), by utilizing the relation:

$$H = \sqrt{H_x^2 + H_y^2}$$

The ratio between the horizontal (noise) signal and the vertical (pilot) signal would then be determined by utilizing this resultant horizontal signal.

Additional improvement in signal quality may also be achieved by initially subtracting the pilot signal from the noise signal. If significant energy from the drill bit is present in the noise (horizontal) signal, the ratio of the amplitude of the drill bit signal in the horizontal (noise) signal to the amplitude of the drill bit signal in the pilot signal is determined utilizing a portion of the frequency spectrum of the two signals below about 40 Hz in which there is little of the horizontal noise energy which may be predominant in the 40 to 80 Hz range. This ratio is normally determined from an average of a number of time samples. Individual samples of the pilot signal are then weighted by this factor and the weighted pilot signal subtracted from the noise signal to substantially remove the drill bit signal from the noise signal. After subtracting the drill bit signal from the noise signals, the invention, as previously described herein, is implemented to subtract the noise (horizontal) signal from the pilot signal.

Although the specific ways and means for practicing the invention have been described and illustrated in the accompanying drawings, it is nevertheless to be understood that this has been done for purposes of illustration only and the scope of the invention is not limited thereby but is determined from the appended claims.

I claim:

1. A method of reducing noise energy in an acoustic pilot signal detected at the top of a drill string deployed in a wellbore, said pilot signal including a signal generated by an energy source positioned substantially at the lower end of said drill string, comprising:
   detecting vertical motion substantially at the top of a drill string to generate a pilot signal;
   detecting horizontal motion substantially at the top of a drill string to generate a noise signal;
   weighting the noise signal within at least a selected frequency band of the noise signal in proportion to the average ratio of the energy in said pilot signal to the energy in said noise signal within a frequency band in which there is high coherence between the amplitude of energy in the noise signal and the pilot signal to generate a weighted noise signal; and
   subtracting the weighted noise signal within at least said selected frequency band from the pilot signal.

2. The method of claim 1 wherein said selected frequency band is substantially equal to said frequency band of high coherence.

3. The method of claim 1 wherein said selected frequency band extends beyond said frequency band of high coherence.

4. The method of claim 1 wherein said energy source comprises a drill bit rotating at the lower end of said drill string to drill said wellbore.

5. The method of claim 4 further comprising:
   generating a display of coherence as a function of frequency between the energy amplitude of said pilot signal and said noise signal; and
   utilizing said display for determining said frequency band of high coherence.

6. The method of claim 4 further comprising determining a factor for weighting said noise signal by comparing the energy amplitude of said noise signal with the energy amplitude of said pilot signal within said high coherence frequency band.

7. The method of claim 6 wherein said factor is determined by taking the ratio within said high coherence frequency band of the energy in said pilot signal to the energy within said noise signal.

8. The method of claim 7 wherein said ratio is determined from the average of a plurality of samples of said pilot signal and said noise signal.

9. The method of claim 7 wherein said ratio is the median ratio of a plurality of samples of said pilot signal and said noise signal.

10. The method of claim 6 wherein said factor is variable as a function of frequency.

11. The method of claim 10 wherein said factor is an average determined utilizing a plurality of samples of said pilot signal and said noise signal.

12. The method of claim 10 wherein said factor is a median determined utilizing a plurality of samples of said pilot signal and said noise signal.

13. The method of claim 1 wherein said horizontal motion is detected by two sensors, said two sensors being positioned to detect motion along two horizontal orthogonal directions, and the output signals from said two sensors are utilized to generate said noise signal.

14. The method of claim 7 wherein said factor is determined at selected time intervals and a value for said factor determined at a given time is applied in order to weight samples of said pilot signal until a new value for said factor is determined.

15. The method of claim 5 wherein said frequency band of high coherence is re-determined at selected time intervals.

16. The method of claim 8 wherein a new value for said factor is determined at selected time intervals and for each determination of a new value a selected number of old samples of said pilot signal and said noise signal are deleted from the samples utilized for determining said average and a selected number of new samples of said pilot signal and said noise signal are added to said samples utilized for determining said average.

17. A method of determining the location of subsurface interfaces in the region of the earth around a wellbore comprising:
generating energy having a detectable pattern at the lower end of a drill string utilized for drilling said wellbore;
detecting with a sensor at the upper end of said drill string adapted to sense vertical motion the energy generated at the lower end of said drill string to generate a pilot signal;
detecting horizontal motion at the upper end of said drill string to generate a noise signal;
detecting seismic energy emanating from said source at least one location at the earth's surface displaced from said wellbore to generate a field signal;
determining a frequency band within said pilot signal and said noise signal in which there is high coherence in the amplitude of noise energy;
weighting said noise signal within at least said frequency band in proportion to the average ratio within said frequency band of the noise energy in said pilot signal to the noise energy within said noise signal to generate a weighted noise signal;
subtracting the weighted noise signal within at least said frequency band from said pilot signal to generate a noise reduced pilot signal; and
correlating said noise reduced pilot signal with said field signal to determine the location of subsurface interfaces.

18. The method of claim 17 wherein said energy having a detectable pattern is generated by a drill bit rotating to drill said wellbore.

19. The method of claim 18 further comprising:
generating a display of coherence as a function of frequency between the energy amplitude of said pilot signal and said noise signal; and
utilizing said display for determining said frequency band of high coherence.

20. The method of claim 18 further comprising determining a factor for weighting said noise signal by comprising the energy amplitude of said noise signal with the energy amplitude of said pilot signal within said high coherence frequency band.

21. The method of claim 20 wherein said factor is determined by taking the ratio within said high coherence frequency band of the energy in said pilot signal to the energy within said noise signal.

22. The method of claim 21 wherein said ratio is determined from the average of a plurality of samples of said pilot signal and said noise signal.

23. The method of claim 21 wherein said ratio is the median ratio of a plurality of samples of said pilot signal and said noise signal.

24. The method of claim 20 wherein said factor is variable as a function of frequency.

25. The method of claim 24 wherein said factor is an average determined utilizing a plurality of samples of said pilot signal and said noise signal.

26. The method of claim 24 wherein said factor is a median determined utilizing a plurality of samples of said pilot signal and said noise signal.

27. The method of claim 17 wherein said horizontal motion is detected by two sensors, said two sensors being positioned to detect motion along two horizontal orthogonal directions, and the output signals from said two sensors are utilized to generate said noise signal.

28. The method of claim 20 wherein said factor is determined at selected time intervals and a value for said factor determined at a given time is applied in order to weight samples of said pilot signal until a new value for said factor is determined.

29. The method of claim 19 wherein said frequency band of high coherence is re-determined at selected time intervals.

30. The method of claim 22 wherein a new value for said factor is determined at selected time intervals and for each determination of a new value a selected number of old samples of said pilot signal and said noise signal are deleted from the samples utilized for determining said average and a selected number of new samples of said pilot signal and said noise signal are added to said samples utilized for determining said average.

31. A method of reducing noise energy in an acoustic pilot signal detected at the top of a drill string deployed in a well bore, said pilot signal including a signal generated by an energy source positioned substantially at the lower end of said drill string, comprising:
detecting vertical motion substantially at the top of a drill string to generate a pilot signal;
detecting horizontal motion substantially at the top of a drill string to generate a noise signal;

determining a factor substantially equal to the ratio of the drill bit energy in said noise signal to the drill bit energy in said pilot signal;

weighting the pilot signal by said factor so that the magnitude of said drill bit energy in said pilot signal is substantially equal to the magnitude of the drill bit energy in said noise signal;

subtracting said weighted pilot signal from said noise signal to generate a second noise signal;

weighting the second noise signal within at least a selected frequency band thereof in proportion to the average ratio of the energy in said pilot signal to the energy in said second noise signal within a frequency band in which there is high coherence between the amplitude of energy in the noise signal and the pilot signal to generate a weighted second noise signal; and subtracting the weighted second noise signal within at least said frequency band from the pilot signal.

* * * * *